United States Patent [19]

Schenck

[11] Patent Number: 5,139,134
[45] Date of Patent: Aug. 18, 1992

[54] WELDABLE URETHANE ROLLER SLEEVE

[75] Inventor: Robert L. Schenck, York, Pa.

[73] Assignee: KRB Machinery Co., York, Pa.

[21] Appl. No.: 765,877

[22] Filed: Sep. 26, 1991

[51] Int. Cl.$^5$ ............................................. B65G 13/02
[52] U.S. Cl. ..................................... 198/780; 193/37;
156/82; 156/187; 156/304.3
[58] Field of Search ............... 198/780, 781, 842, 843,
198/844.2; 193/37; 156/82, 187, 304.3, 304.5,
304.6

[56] References Cited

U.S. PATENT DOCUMENTS

| | | |
|---|---|---|
| 1,803,357 | 5/1931 | Robins . |
| 2,253,141 | 8/1941 | Schofield . |
| 3,563,721 | 2/1971 | Ritter, Jr. .......................... 198/781 X |
| 3,895,990 | 7/1975 | Josteit ............................... 156/304.3 |
| 3,993,522 | 11/1976 | Ballou ........................... 156/304.6 X |
| 4,047,993 | 9/1977 | Bartelmuss ................... 156/304.3 X |
| 4,215,516 | 8/1980 | Huschle et al. ............... 156/304.3 X |
| 4,235,952 | 11/1980 | Holmes et al. ............... 156/304.3 X |
| 4,312,444 | 1/1982 | Mushovic ........................ 198/780 |
| 4,535,526 | 8/1985 | Zerfass et al. . |
| 4,864,704 | 9/1989 | Hogan et al. ...................... 193/37 X |
| 4,926,995 | 5/1990 | Kauffman ........................... 193/37 |

Primary Examiner—Joseph E. Valenza
Assistant Examiner—Tuan N. Nguyen
Attorney, Agent, or Firm—Samuel M. Learned, Jr.

[57] ABSTRACT

A weldable urethane roller sleeve, and method of fabricatingly installing the same, on site without having to remove the rollers from a machine in order to accomplish installation upon either powered or idler rollers of a roll conveyancing machine of that type typically employed in shear line applications to accomplish movement of reinforcing rods to and from a cutting station, wherein the inside diameter of the roller sleeve which is installed is oversized to be slightly larger than that of the outside diameter of the roller upon which it is installed, thereby enabling the roller sleeve to rotate upon the roller as the roller rotates, which in turn results in reduced wear and impact damage to the roller sleeve since it rotationally displaces with the moving product during the conveyancing thereof.

6 Claims, 2 Drawing Sheets

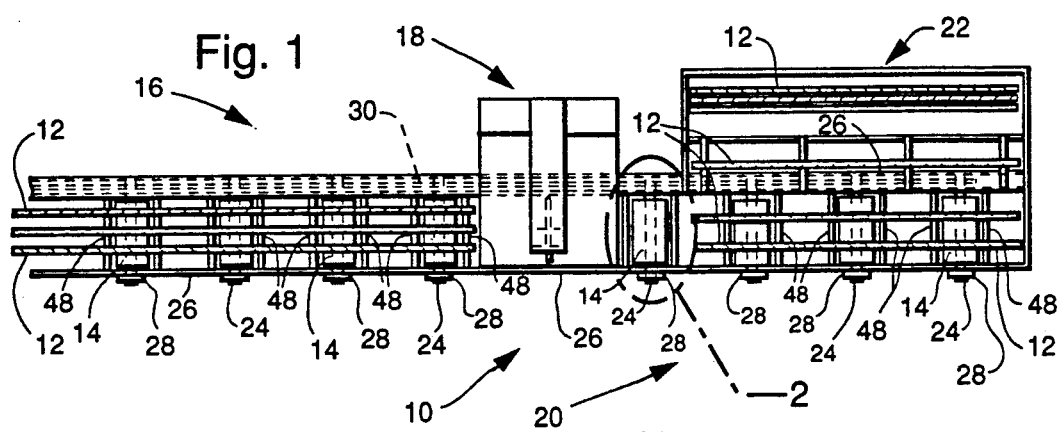
Fig. 1
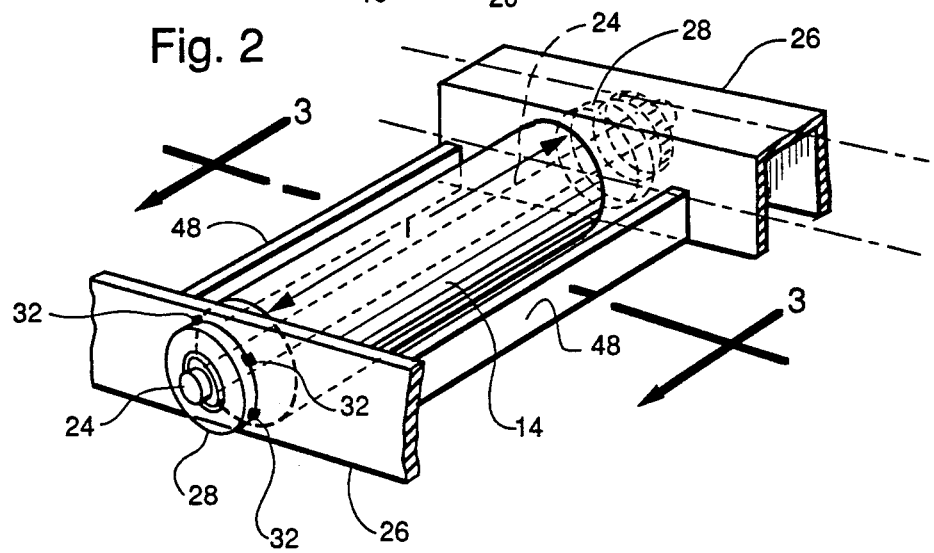
Fig. 2
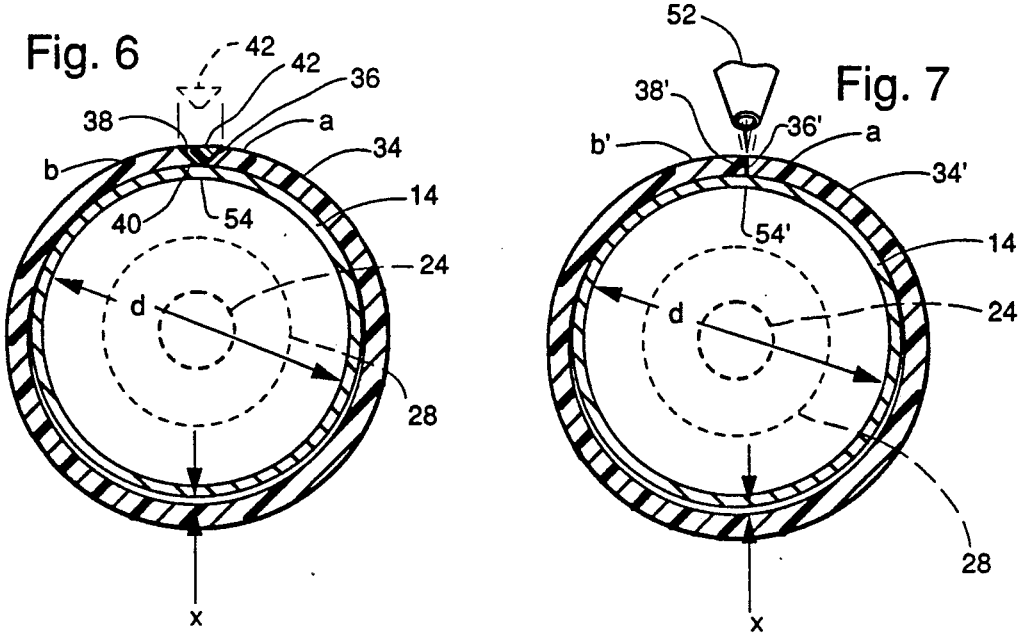
Fig. 6
Fig. 7

WELDABLE URETHANE ROLLER SLEEVE

BACKGROUND OF THE INVENTION

The instant invention relates to employment of a tough wear resistant resilient substance for use as a covering material on the rollers of a roller conveyor to dampen operational noise levels as well as to substantially reduce nicking and marring of the coating and finish on conveyed product, in addition to providing an economical and efficient means and method for on site fabricatingly installing replacements of worn or damaged roller covers when the need arises. In particular, the substance used as roller sleeve replacement material herein is weldable urethane sheet, and the type roll conveyors involved are those typically employed in moving steel reinforcing bars and rods into and out of a cutting station on a shear line.

Characteristically, the conveyancing machinery employed in a reinforcing bar shearing line operation, for both input and output transport of reinforcing bar material to and from the cutting station, employ bare steel rollers which contribute to the creation of extremely high metal-to-metal noise levels during conveyancing, in addition to nicking and damaging the reinforcing bar rust-inhibiting protective epoxy coating during conveyancing.

Past use of resilient plastic and rubber materials for reinforcing bar conveyor roller covering to reduce noise levels and epoxy coating nicking has been unsatisfactory with respect to two factors, first the time and cost of removing the roller form a conveyor frame to effect recoating the thereafter the additional time and cost to reinstall the rollers, and second the relatively short wear life of such coatings due primarily to the fact they were bonded to the supporting roller core which did not then allow for rotational slippage of the covering thereon and thereby did not enable rotational displacement absorption of high impact shocks from forward moving pieces of reinforcing bar during conveying, which would result in gouging in the pliable roller sleeve thereby contributing to accellerated wear and shortened life of the roller covering. Teachings which exemplify the core-bonded cushioned roller sleeve structures are those as respectively set forth in U.S. Pat. No. 4,312,444 to Mushovic dated Jan. 26, 1982, and U.S. Pat. No. 4,864,704 to Hogan et al dated Sep. 12, 1989.

A prior art teaching owned by Assignee herein, which obviated both the foregoing problems, was as set forth in U.S. Pat. No. 4,926,995 to Kauffman, dated May 22, 1990, which was for a separable roller sleeve having the features of being easily and quickly installed upon a conveyor roller without removal thereof, and also being slightly oversized to allow for the rotational displacement absorption of high impact shocks form forward moving pieces of reinforcing bar during conveying. Under most roller conveyor replacement sleeve applications the Kauffman separable roller sleeve proves fully adequate and satisfactory, however, in some instances where there are large conveyor rollers (those having diameters of say six-inches or greater), or the operational conditions such as conveyor speed or conveyed product load density would warrant it, a connected replacement roller sleeve has proven to work more satisfactorily.

The applicant herein, by his weldable roller sleeve invention, retains the efficiency and economy of accomplishing replacement sleeve installation on site without having to remove rollers from the conveyor and retains the replacement sleeve oversize rotational slippage feature to enhance wear life as obtained with the separable roller sleeve, in addition to providing a connected replacement roller sleeve capability for all applications, regardless of roller size and operational conditions, and especially those roller sleeve replacement applications where the roller size or operational conditions are such as to otherwise render employment of a separable sleeve replacement less than fully satisfactory.

SUMMARY OF THE INVENTION

It is the principal object of the present invention to provide a weldable urethane roller sleeve, and method of installing the same, which will provide either a retrofit or replacement roller sleeve installation capability for both powered and idler rollers on typical roll conveying machines, without the need or necessity of removing or replacing each roller assembly in accomplishing either the retrofit or replacement roller sleeve installation.

It is another object of the present invention to provide both a mechanically tough yet physically resilient weldable urethane roller sleeve material whereby the bare rollers of a typical roll conveying machine, whether powered or idler, may be protected so as to substantially extend the useful lives thereof and thereby in turn substantially reduce the maintenance, repair, and replacement costs otherwise normally associated therewith when operated unprotected.

It is also an object of the present invention to provide a weldable urethane roller sleeve which will function to dampen, absorb, and substantially reduce the high noise levels otherwise associated with roller conveying of materials, and especially the conveying of metal rod and bar materials, upon unprotected bare rollers of the typical roll conveying machine.

Still another object of the present invention is to provide a weldable urethane roller sleeve which will not nick or damage protective coatings upon materials transported during conveying operations, such as epoxy rust preventive coatings currently applied to steel reinforcing bar, so as to thereby substantially reduce the costs and inconveniences otherwise necessitated and associated with manual touch-up of damaged coating resultant when conveyancing is accomplished upon unprotected rolls of the typical roll conveying machine.

Yet another object of the present invention is to provide a simple and inexpensive weldable urethane roller sleeve, and a facilitated method for operational assembly thereof, which is adapted for accomplishment by persons not possessed of any special mechanical skills or talent.

The foregoing, and other objects hereof, will be readily evident upon a study of the following specification and accompanying drawings comprising a part thereof.

BRIEF DESCRIPTION OF THE DRAWINGS

FIG. 1 is a simplified top plan view of a typical roller conveying machine generally of that type employed in a shear line to accomplish movement of reinforcing bar rods t and from an intermediary cutting station.

FIG. 2 is an enlarged perspective view of a typical roller assembly generally as shown at "2" of the roll conveying machine illustrated in FIG. 1.

FIG. 6 is an enlarged cross-sectional view of a roller showing the preferred embodiment weldable urethane roller sleeve installed thereon in accordance with the present invention.

FIG. 7 is an illustration similar to that of FIG. 6, but herein showing an enlarged cross-sectional view of a roller with an alternate embodiment weldable urethane roller sleeve installed thereon in accordance with the present invention.

DETAILED DESCRIPTION OF THE INVENTION

Figure 3:
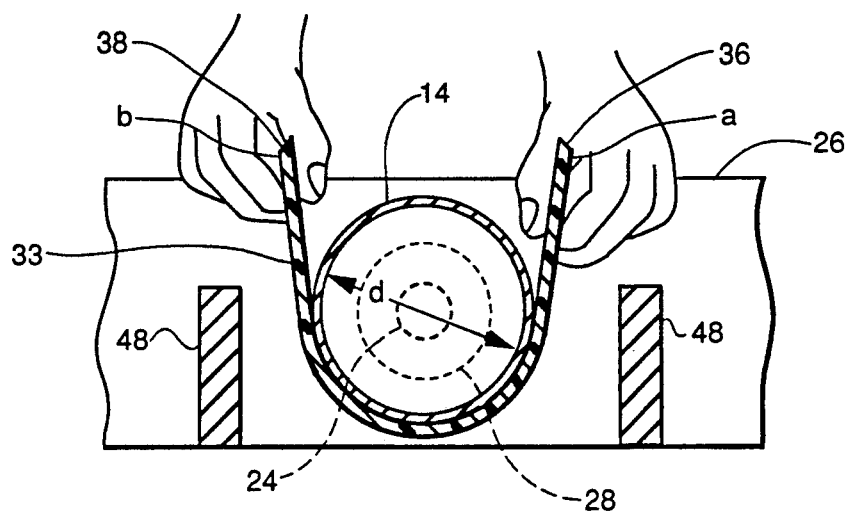
FIG. 3 is an enlarged cross-sectional view of the roller assembly as shown in FIG. 2 and seen along the line 2—2 thereof, further therein illustrating the manner of manually installing a sheet of weldable urethane material prepatory to the forming and fabrication therefrom of a preferred embodiment roller sleeve in accordance with the present invention.

Referring to FIG. 1, a simplified top plan view of a typical reinforcing bar roll conveying machine 10 is shown, being generally of that type traditionally employed in a shear line to accomplish loading and movement of epoxy coated reinforcing bars 12 by means of rollers 14 through an infeed section 16 of said machine 10, therefrom to a cutting station 18 where said bars 12 are cut to sue lengths for a particular job, and then delivered to an outfeed section 20 for deposit in an accumulator 22. As also illustrated in FIG. 1 the roller shafts 24 are typically supported in the conveyor frame 26 by means of bearings 28 and either function as idler rollers or are driven by a roller chain drive 30 which engages drive sprockets assembled to various of said roller shafts 24.

Until recent times the rollers 14 were typically bare metal, usually steel, which among other things created very high noise levels during conveyancing of reinforcing bar material due to the rotating metal-to-metal impact of the bare metal roller with the ribbed reinforcing bar, and with the advent of epoxy coated reinforcing bar 12 specifically to inhibit and prevent rusting the metal-to-metal impact effect as above described further caused unacceptable nicking and damage to the epoxy coating thereby necessitating an additional operation of manual touch-up.

A ready and mechanically responsive solution to remedy both the high noise levels and epoxy coated reinforcing bar nicking problems is to equip the machine 10 with rollers having a sound dampening and impact cushioning resilient covering. The problem of implementing such a remedy, however, in either retrofitting older machines 10 with resilient coated and protected rollers, or replacing such rollers on new machines 10 when either damaged or worn out, is illustrated in FIG. 2 which shows greater detail of the relatively permanent in-frame roller installation assembly typical of a roll conveying machine 10 whether of past or present construction.

Considering now FIG. 2, which shows more specifically the nature of the mechanical problem encountered when attempting to upgrade a bare roller 14 roll conveying machine 10 to a roll conveying machine having either cushioned rollers or rollers 14 provided with resilient roller sleeves. As illustrated in FIG. 2, which is a typical representation of past and generally present roller 14 mounting methodology for installing rollers 14 within a conveyor frame 26, whether those rollers are bare metal or cushioned, the roller shaft 24 is assembled within a set of bearings 28 that are typically affixed in an aligned and spaced relationship to the opposing conveyor frame 26 member by means of spot welds 32. In order t remove a roller 14 for purposes of installing a resilient sleeve or the like thereon, or to completely replace a bar metal roller 14 with a cushioned roller, excepting in the case of installing a separable roller sleeve as aforementioned, it becomes necessary to break spot welds 32 on at least one bearing 28 in order to remove and replace the roller 14 with either a resilient sleeve installed thereon or with a cushioned roller, afterwhich, with the roller shaft 24 inserted, it is then necessary to reweld the removed bearing back in aligned relationship upon the conveyor frame 26. Although the foregoing procedure is mechanically feasible and can be accomplished in retrofitting an older roll conveying machine 10 with either roller sleeves or cushioned rollers to meet current operational standards for reduced noise levels and transporting epoxy coated reinforcing bar 12 as previously described, the use of weldable urethane roller sleeves 34, as herein taught and illustrated in FIGS. 3 through 7 hereinafter, enables the one site fabricating installation of a resilient sleeve upon a bare metal roller 14, or the removal and replacement thereof in operational circumstances where the use of a separable roller sleeve would not be suitable, with just as efficient a result i meeting both improved operational standards and service life, plus the added advantage of not having to remove and replace nay of the machine 10 components in so doing.

Figure 4:
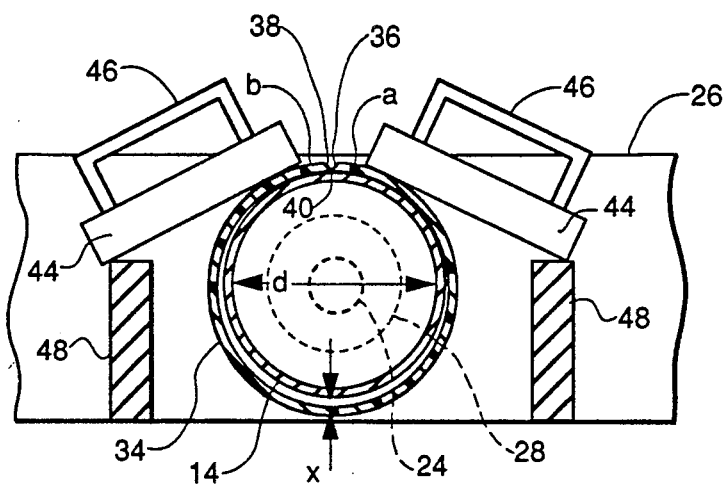
FIG. 4 is a view of the roller assembly similar to that as shown in FIG. 3, but herein illustrating the formed preferred embodiment roller sleeve as it would appear positioned upon the roller prepatory to the weldable fabrication thereof in accordance with the present invention.
Figure 5:
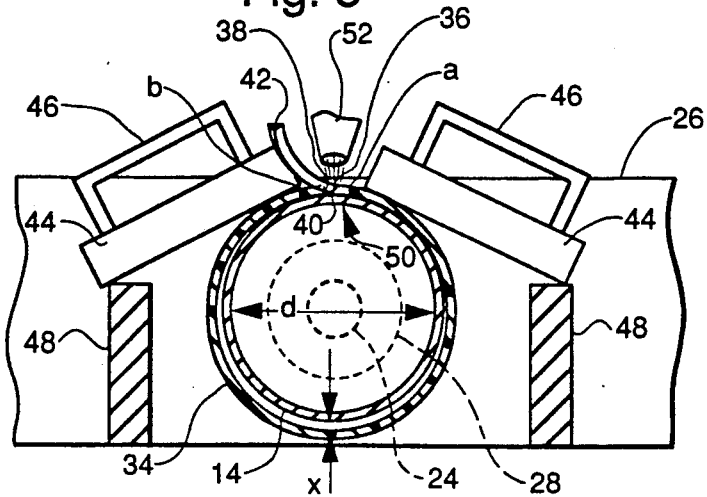
FIG. 5 is a view of the roller assembly similar to that as shown in FIG. 4, but herein illustrating weldable fabrication of the preferred embodiment roller sleeve upon the roller in accordance with the present invention.

Directing attention now to the FIG. 3 through FIG. 5 illustrations, which progressively depict i a simplified enlarged and elevation series of views as seen along the line 3—3 of FIG. 2 the sequential method of installing a weldable urethane roller sleeve 34 upon a bare metal roller 14 of a typical reinforcing bar roll conveying machine 10.

Depending on the outside diameter "d" of the roller 14, a sheet of weldable urethane material 33 is cut to a dimension slightly greater than that of the roller 14 circumferential dimension to provide an approximate one-quarter inch oversize as shown at "x" in FIGS. 4 and 5 when the free ends of the material are abutted for weldable joining to form a roller sleeve 34, with the other dimension of said sheet being cut to the length "l" as shown in FIG. 2 of the roller 14 to which it is to be fabricatingly installed.

Assembly of the sheet 33 in position about the roller 14 is accomplished manually as illustrated in FIG. 3. While the roller 14 remains in the conveyor frame 26 of said machine 10, the sheet 33 is wrapped thereabout and the free ends "a" and "b" thereof are abutted one against the other at the top of the roller 14 as shown in FIG. 4, with the excess diameter dimension falling to the bottom in formation of the roller sleeve oversize "x".

It will be noted as shown in FIG. 3, and FIGS. 4 through 6, the longitudinal roller axis ends "a" and "b", initially of the sheet 33 and then of the sleeve 34, are cut on an incline to thereby provide the respective heat seal surfaces 36 and 38 for on site fabricatingly joining of the longitudinal roller axis sheet ends "a" and "b" to form a roller sleeve, as well as to also form a "V"-trough 40 for conveniently receiving and supporting a V-shaped weldable urethane strip 42 as shown in FIG. 5 whereby an on site weldable joining of the ends "a" and "b" is facilitated.

Once the sheet of weldable urethane material 33 is insertably installed manually about the roller 14 as shown in FIG. 3, the respective ends "a" and "b" of said sheet 33 are positioned in abuttable contact upon the roller 14 top surface as shown in FIG. 4 to thereby form the "V"-trough 40 prepatory to weldable joining of said ends "a" and "b" along the respective heat seal surfaces 36 and 38 thereof to form the roller sleeve 34. In order to hold the ends of the sheet in a roller sleeve configuration for welding, as shown in FIG. 4, a set of suitable anvils 44 having handles 46 for ease of movement and positioning are employed, being conveniently supported at one end respectively thereof on the conveyor frame cross braces 48 and at the other ends respectively thereof on the unjoined roller sleeve ends "a" and "b". With this roller sleeve 34 profile of on site formation the roller sleeve oversize "x" excess falls to the bottom of the roller 14, thereby providing the sleeve 34 rotational slippage feature as previously explained whereby improved roller sleeve 34 performance and wear life are achieved.

With the urethane sheet 33 manually formed into a roller sleeve 34 configuration, and held in such configuration upon the roller 14 by means f anvils 44 as shown in FIG. 4, the next step is to weldably join the ends "a" and "b" as is shown in FIG. 5. Weldable connection of the ends "a" and "b" to form a weldable urethane roller sleeve 34 is thereafter accomplished by forming a weldable urethane seam assembly 50 made by positioning a V-shaped weldable urethane strip 42 in the "V"-trough 40 as formed by abuttable joining of the ends "a" and "b" so that said strip 42 fills said trough 40 and there is contiguous contact between the sides of said strip 42 and the heat seal surfaces 36 and 38 of the ends "a" and "b", all as shown in FIG. 5. With the strip 42 thus positioned and held in place, an operator then manually directs a hot air heat source 52 upon the strip 42 and heat seal surfaces 36 and 38 comprising the weldable urethane seam assembly 52 to thereby thermally fuse the same into a roller sleeve seam weld 54 as shown in FIG. 6.

An alternate roller sleeve seam weld 54' is shown in FIG. 7, which is simply formed by weldable heat-seal fusing of an alternate weldable urethane seam assembly 50' formed by the abuttable joining of flush-cut heat seal surfaces 36' and 38' respectively of the ends "a'" and "b'". This modified technique may be an alternate method for satisfactorily forming an alternate roller sleeve seam weld 54' when the roller sleeve 34' resultant therefrom would be subjected to a less rigorous operational use environment.

Although the weldable urethane roller sleeve invention hereof, the structural characteristics and method of employment thereof, respectively have been shown and described in what is conceived to be the most practical and preferred embodiment, it is recognized that departures may be made respectively therefrom within the scope of the invention, which is not to be limited per se to those specific details as disclosed herein but is to be accorded the full scope of the claims so as to embrace any and all equivalent such devices, apparatus, and methods.

I claim:

1. In combination with a typical roll conveying machine having a plurality of conveyor rollers, a weldable synthetic material roller sleeve adapted to be fabricatingly formed from a weldable synthetic material for enclosable installation upon a bare conveyor roller of said typical roll conveying machine while said bare conveyor roller remains assembled thereon said weldable synthetic material roller sleeve comprising, a sheet of said weldable synthetic material cut to a length dimension equal to that of said bare conveyor roller upon which it is to be installed and a circumferential dimension closely complementary but oversized to that of said bare conveyor roller by such an amount so as to provide a mechanically loose fitting disposition therebetween when abuttably formed manually into a cylindrical sleeve thereabout along the respective sheet ends of said circumferential dimension, and a V-trough formed at the abuttment of said respective ends of said circumferential dimension and a V-shaped weldable synthetic material strip adapted to be received within said V-trough for heat fused weldable joining of said respective ends of said circumferential dimension thereby to closably join said ends by means of a seam weld and form a roller sleeve upon said bare roller.

2. A weldable synthetic material roller sleeve according to claim 1 wherein the amount of oversize of said sleeve in relation to the bare conveyor roller upon which it is fabricatingly assembled is typically one-quarter inch.

3. A weldable synthetic material roller sleeve according to claim 1 wherein said weldable synthetic material is urethane.

4. In combination with a typical roll conveying machine having a plurality of conveyor rollers, a weldable synthetic material roller sleeve adapted to be fabricatingly formed from a weldable synthetic material for enclosable installation upon a bare conveyor roller of said typical roll conveying machine while said bare conveyor roller remains assembled therein said weldable synthetic material roller sleeve comprising, a sheet of said weldable synthetic material cut to a length dimension equal to that of said bare conveyor roller upon which it is to be installed and a circumferential dimension closely complementary but oversized to that of said bare conveyor roller by such an amount so as to provide a mechanically loose fitting disposition therebetween when abuttably formed manually into a cylindrical sleeve thereabout along the respective sheet ends of said circumferential dimension, and a perpendicularly complementary abuttment of said respective ends of said circumferential dimension adapted to be heat fused in a weldable joining thereof thereby to closably join said ends by means of a seam weld and form a roller sleeve upon said bare roller.

5. A weldable synthetic material roller sleeve according to claim 4 wherein the amount of oversize of said sleeve in relation to the bare conveyor roller upon which it is fabricatingly assembled is typically one-quarter inch.

6. A weldable synthetic material roller sleeve according to claim 4 wherein said weldable synthetic material is urethane.

* * * * *